United States Patent
Faibish et al.

(10) Patent No.: US 10,223,025 B1
(45) Date of Patent: Mar. 5, 2019

(54) RECONFIGURABLE MULTI-TIER STORAGE SYSTEM COMPRISING REPLICATED STORAGE UNITS

(71) Applicant: EMC IP Holding Company LLC, Hopkinton, MA (US)

(72) Inventors: Sorin Faibish, Newton, MA (US); Percy Tzelnic, Concord, MA (US); Dennis Ting, Groton, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 15/386,705

(22) Filed: Dec. 21, 2016

(51) Int. Cl.
G06F 3/06 (2006.01)

(52) U.S. Cl.
CPC .......... *G06F 3/0644* (2013.01); *G06F 3/0604* (2013.01); *G06F 3/067* (2013.01); *G06F 3/0634* (2013.01)

(58) Field of Classification Search
CPC ...... G06F 3/067; G06F 3/0604; G06F 3/0644; G06F 3/0634
USPC ........................................................ 711/171
See application file for complete search history.

(56) References Cited

U.S. PATENT DOCUMENTS 9,569,513 B1 * 2/2017 Vig .................... G06F 17/30575
2013/0227194 A1 8/2013 Kannan et al.

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.
EMC Corporation, "EMC Tiered Storage for SAP: a New Way to Optimize with Use Cases for EMC Symmetrix VMAX with FAST and Virtual LUN," White Paper, Applied Technology, May 2010, 14 pages.
EMC Corporation, "EMC ScaleIO," V1.32, User Guide, #302-001-033, Rev. 11, May 2015, 536 pages.
EMC Corporation, "EMC 2-Tiers—POSIX Namespace for 2nd and 3rd Platform Storage Systems," Dec. 2015, 3 pages.
J. Hilland et al., "RDMA Protocol Verbs Specification (Version 1.0)," draft-hillard-iwarp-verbs-v1.0, Apr. 2003, 243 pages.

(Continued)

*Primary Examiner* — Hua J Song
(74) *Attorney, Agent, or Firm* — Ryan, Mason & Lewis, LLP

(57) ABSTRACT

An apparatus in one embodiment comprises a reconfigurable multi-tier storage system having at least a front-end storage tier and a back-end storage tier. The multi-tier storage system is implemented at least in part utilizing a plurality of replicated storage units. One or more of the replicated storage units are each utilized in a first configuration of the reconfigurable multi-tier storage system to implement a portion of at least one of a burst buffer appliance and a software-defined storage pool of the front-end storage tier. At least one of the one or more replicated storage units is utilized in a second configuration of the reconfigurable multi-tier storage system to implement a portion of at least one of a scale-out network-attached storage cluster and an object store of the back-end storage tier. A given one of the replicated storage units may be reconfigured by rebooting it using different software modules.

20 Claims, 7 Drawing Sheets

(56) References Cited

OTHER PUBLICATIONS

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System.".

Adam Moody, "Overview of the Scalable Checkpoint / Restart (SCR) Library," S&T Principal Directorate—Computation Directorate, Oct. 14, 2009, 33 pages.

U.S. Appl. No. 14/973,245 filed in the name of Sorin Faibish et al. on Dec. 17, 2015 and entitled "Multi-Tier Storage System Having Front-End Storage Tier Implemented Utilizing Software-Defined Storage Functionality."

U.S. Appl. No. 15/185,236 filed in the name of Sorin Faibish et al. on Jun. 17, 2016 and entitled "Storage System Comprising Cluster File System Storage Nodes and Software-Defined Storage Pool in Cloud Infrastructure."

* cited by examiner

RECONFIGURABLE MULTI-TIER STORAGE SYSTEM COMPRISING REPLICATED STORAGE UNITS

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include reconfigurable multi-tier storage systems comprising replicated storage units. For example, one or more of the replicated storage units of a reconfigurable multi-tier storage system can be repurposed for use in different storage tiers in respective different configurations of the reconfigurable multi-tier storage system. The storage units implement at least one of a burst buffer appliance and a software-defined storage pool in a fast tier or other front-end storage tier of the storage system and implement at least one of a scale-out NAS cluster and an object store in a capacity tier or other back-end storage tier of the storage system. The configuration of the replicated storage units is illustratively carried out at least in part under software control. Such a reconfigurable multi-tier storage system arrangement can provide a substantial reduction in the costs associated with storage deployment in a wide variety of different information processing system contexts.

In one embodiment, an apparatus comprises a multi-tier storage system having at least a front-end storage tier and a back-end storage tier. The multi-tier storage system is implemented at least in part utilizing a plurality of replicated storage units. One or more of the replicated storage units are each utilized in a first configuration of the reconfigurable multi-tier storage system to implement a portion of at least one of a burst buffer appliance and a software-defined storage pool of the front-end storage tier. At least one of the one or more replicated storage units is utilized in a second configuration of the reconfigurable multi-tier storage system to implement a portion of at least one of a scale-out network-attached storage cluster and an object store of the back-end storage tier. A given one of the one or more replicated storage units is reconfigured from utilization in the first configuration to utilization in the second configuration by rebooting the given replicated storage unit utilizing one or more different software modules than those with which it was booted for utilization in the first configuration.

In addition to the above-noted advantages of configuration flexibility and substantially reduced cost, illustrative embodiments can provide significant improvements in terms of data access performance and scalability relative to conventional arrangements. For example, reduced data access latency can be provided and larger numbers of compute nodes supported than in conventional multi-tier storage system arrangements.

These and other illustrative embodiments include, without limitation, apparatus, systems, methods and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise computing and storage systems are also encompassed by the term "information processing system" as that term is broadly used herein.

Figure 1:
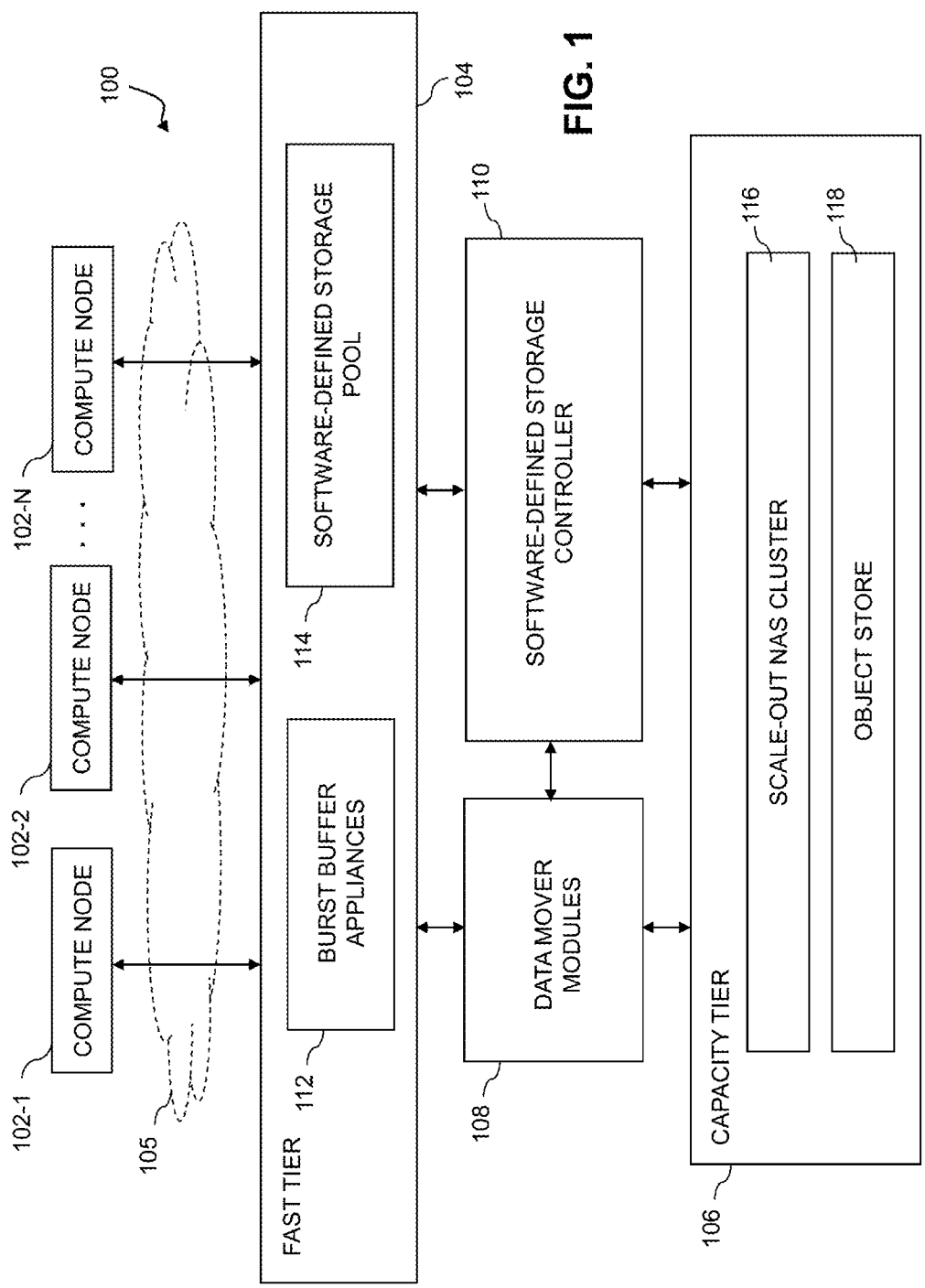
FIG. 1 is a block diagram of an information processing system comprising a reconfigurable multi-tier storage system implemented using multiple replicated storage units in an illustrative embodiment of the invention.

FIG. 1 shows an information processing system 100 configured in accordance with an illustrative embodiment of the present invention. The information processing system 100 comprises compute nodes 102-1, 102-2, . . . 102-N. The compute nodes 102 communicate over a network 105 with a fast tier 104 of a reconfigurable multi-tier storage system. The multi-tier storage system further comprises a capacity tier 106, data mover modules 108 and a software-defined storage controller 110.

The compute nodes 102 illustratively comprise respective processing devices of one or more processing platforms. For example, the compute nodes 102 can comprise respective virtual machines each having a processor and a memory. Numerous other configurations are possible. In some embodiments, the compute nodes 102 are part of a supercomputer or other type of high-performance computing (HPC) system.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The fast tier 104 is an example of what is more generally referred to herein as a "front-end storage tier" of the multi-tier storage system. Other types of front-end storage tiers can be used in other embodiments.

The fast tier 104 in the present embodiment is more particularly configured to include a plurality of burst buffer appliances 112 and a software-defined storage pool 114. At least portions of the fast tier 104 are implemented in some embodiments as a plurality of storage nodes accessible to the compute nodes 102.

A given "storage node" as the term is used herein is intended to encompass a data node, a metadata node, or another type of node providing access to at least one of data and metadata for one or more associated compute nodes. The term "compute node" is also intended to be broadly construed, and generally encompasses a system node that runs at least a portion of at least one application.

The burst buffer appliances 112 and software-defined storage pool 114 in some embodiments are implemented at least in part using electronic memories such as flash memories, dynamic random access memories (DRAMs), or various combinations of flash, DRAM or other types of electronic memory.

The software-defined storage pool 114 provided by the fast tier 104 is assumed to be implemented under the control of the software-defined storage controller 110 and may illustratively obtain data from the capacity tier 106 via one or more of the data mover modules 108.

Processing devices utilized to implement system components such as the data mover modules 108, software-defined storage controller 110, burst buffer appliances 112 and software-defined storage pool 114 are assumed to be interconnected with one another using high-speed connections. For example, data can be moved between these and other system components using remote direct memory access (RDMA) connections over Gigabit Ethernet ("GbE") or InfiniBand ("TB"). As another example, some embodiments can be configured to utilize an Intel Omni-Path Host Fabric Interface (OP HFI). Numerous other types of connections and associated data transfer protocols can be used in other embodiments, including Fibre Channel.

As indicated above, the software-defined storage controller 110 is assumed to be part of the reconfigurable multi-tier storage system that in the FIG. 1 embodiment further comprises the fast tier 104, the capacity tier 106 and the data mover modules 108. Such a storage system or individual portions thereof are further assumed to be configured for communication with the compute nodes 102 over the network 105. The capacity tier 106 is an example of what is more generally referred to herein as a "back-end storage tier" of the multi-tier storage system. Other types of back-end storage tiers can be used in other embodiments.

The software-defined storage controller 110 in some embodiments is implemented using software-defined storage products such as ScaleIO™ or ViPR® both of which are commercially available from Dell EMC of Hopkinton, Mass.

For example, implementations utilizing ScaleIO™ for the software-defined storage controller 110 can advantageously support hundreds or thousands of compute nodes, potentially providing a single memory pool with a capacity on the order of a petabyte (PB). Such an arrangement overcomes scalability limitations inherent in certain conventional systems. Also, failure protection functionality provided by ScaleIO™ can be used to protect the fast tier 104 from failures in one or more storage nodes.

More particularly, the fast tier 104 may be configured to recover from a failure in one of its storage nodes by obtaining corresponding data from another one of its storage nodes. Such failure recovery is assumed to be directed at least in part by the software-defined storage controller 110. A wide variety of other types of configuration or control of the fast tier 104 can be provided by the software-defined storage controller 110.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The capacity tier 106 in the present embodiment is more particularly configured to include a scale-out network-attached storage (NAS) cluster 116 and an object store 118. At least portions of the capacity tier 106 in some embodiments are considered part of the above-noted storage nodes accessible to the compute nodes 102.

The data mover modules 108 are illustratively configured to move data between the fast tier 104 and the capacity tier 106. Although shown as separate from the software-defined storage controller 110, the data mover modules 108 in other embodiments can be implemented at least in part within the software-defined storage controller 110.

The scale-out NAS cluster 116 of the capacity tier 106 is illustratively implemented using Isilon® platform nodes and associated accelerators in the S-Series, X-Series and NL-Series product lines, all commercially available from Dell EMC.

The object store 118 of the capacity tier 106 is illustratively implemented using cloud storage such as Elastic Cloud Storage (ECS) from Dell EMC. Other examples of object stores that can be used in a given embodiment include object stores implemented using object-based storage products such as Atmos, also from Dell EMC.

The object store 118 in some embodiments is part of the same cloud infrastructure that provides the compute nodes 102. Examples of cloud-based object stores that can be utilized for object store 118 in some embodiments include Amazon Simple Storage Service (S3), GCP Cloud Storage, and Microsoft Azure Blob Storage.

The object store 118 of the capacity tier 106 is configured to store a plurality of objects. In other embodiments, the capacity tier 106 could comprise multiple object stores, or other types of object storage. Each of the objects stored in the object store 118 is assumed to have a unique object identifier (OID).

A specified set of objects stored in the object store 118 may be made accessible to an application running on a given one of the compute nodes 102 via a corresponding dynamically loadable namespace (DLN) identifier. The DLN identifier is associated with a DLN object stored in the object store 118, with the DLN object comprising identifiers of respective ones of the objects in the specified set.

In some embodiments, a translator at least partially incorporated in or otherwise associated with the multi-tier storage system implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of the object store 118 of the capacity tier 106 are made accessible to the application via the name node. The translator via the translation services and the at least one index table permits applications running on respective compute nodes having no knowledge of the object storage structure of the object store 118 to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed and entitled "Translation-Based Name Node Configuration for Object Access in a Multi-Tier Storage System," which is commonly assigned herewith and incorporated by reference herein.

It should be noted that software-defined storage may also be used for the object store 118 or other portions of the capacity tier 106. For example, in such an arrangement, first and second different sets of software-defined storage parameters can be used in respective ones of the fast and capacity tiers.

The reconfigurable multi-tier storage system in the FIG. 1 embodiment is assumed to be implemented at least in part utilizing a plurality of replicated storage units. Examples of particular structural arrangements of replicated storage units will be illustrated in the embodiments of FIGS. 4 through 7 below, although it is to be appreciated that other types of replicated storage units can be used in other embodiments. The term "replicated storage units" in this context and elsewhere herein refers to storage units that have substantially the same physical structure but can be reconfigured under software control to provide different types of storage functionality within a reconfigurable multi-tier storage system. A given replicated storage unit illustratively comprises a self-contained rack-mountable chassis having separate power, cooling and network interface arrangements.

One or more of the replicated storage units of the reconfigurable multi-tier storage system in the FIG. 1 embodiment are each utilized in a first configuration of the reconfigurable multi-tier storage system to implement a portion of one or more of the burst buffer appliances 112 and the software-defined storage pool 114 of the fast tier 104.

Additionally, at least one of the one or more replicated storage units is utilized in a second configuration of the reconfigurable multi-tier storage system in the FIG. 1 embodiment to implement a portion of at least one of the scale-out NAS cluster 116 and the object store 118 of the capacity tier 106.

One or more of the replicated storage units can therefore be repurposed from implementing part of the fast tier 104 in the first configuration to implementing part of the capacity tier 106 in the second configuration.

A given one of the one or more replicated storage units is reconfigured from utilization in the first configuration to utilization in the second configuration by rebooting the given replicated storage unit utilizing one or more different software modules than those with which it was booted for utilization in the first configuration. For example, the different software modules in some embodiments comprise respective different device drivers that allow the given replicated storage unit to alter the communication protocols that it utilizes to exchange data and other information with other replicated storage units.

In some embodiments, reconfiguration of the reconfigurable multi-tier storage system is controlled at least in part utilizing distinct configuration files provided to the replicated storage units for configuring the replicated storage units to implement respective ones of the first and second configurations. Such configuration files illustratively include information relating to the particular software modules to be utilized in booting or rebooting the replicated storage units for the corresponding configurations. A particular one of the configuration files may be selectable by an administrator at a boot time of the replicated storage units. Additionally or alternatively, a particular one of the configuration files may be selected and executed automatically by the reconfigurable multi-tier storage system under particular specified conditions.

As a more specific example, a given one of the configuration files mentioned above can include configuration information specifying a particular operating system (OS) type as well as the particular network fabric, cluster network, non-volatile memory and storage drive arrangements to be utilized in the corresponding configuration. Also included in the configuration file is additional configuration information specifying particular software modules to be loaded into a storage processor at boot time of the replicated storage unit. Such software modules can further include software modules associated with particular versions of the storage software of the burst buffer appliances 112, the software-defined storage pool 114, the scale-out NAS cluster 116 and the object store 118, depending upon the expected usage of the replicated storage unit in the corresponding configuration.

Although first and second configurations are mentioned in the foregoing description, numerous other configurations are possible. Accordingly, such references above and elsewhere herein to first and second configurations of a reconfigurable multi-tier storage system should not be construed as limiting on the particular number of different configurations that may be used in a given embodiment.

The fast tier 104 in the FIG. 1 embodiment illustratively implements a parallel file system (PFS) of the reconfigurable multi-tier storage system. As a more particular example, the PFS in some implementations of the FIG. 1 embodiment illustratively comprises OFS ("OrangeFS"), although it is to be appreciated that other file systems, or combinations of multiple file systems of potentially different types, can be used in other embodiments. Parallel file systems in some implementations of this type are also sometimes referred to as "distributed file systems" or "cluster file systems." The PFS is illustratively associated with the software-defined storage pool 114 of the fast tier 104.

As noted above, various ones of the replicated storage units of the reconfigurable multi-tier storage system in the information processing system of FIG. 1 can be utilized to implement one or more components of the fast tier 104 in a first configuration and subsequently repurposed through software control so as to be utilized to implement one or more components of the capacity tier 106 in a second configuration.

For example, a given one of the replicated storage units in the first configuration is utilized to implement a portion of the PFS of the software-defined storage pool 114 of the fast tier 104 and in the second configuration is utilized to implement one or more nodes of the scale-out NAS cluster 116 of the capacity tier 106.

As another example, a given one of the replicated storage units in the first configuration is utilized to implement a portion of the PFS of the software-defined storage pool 114 of the fast tier 104 and in the second configuration is utilized to implement one or more object storage servers for the object store 118 of the capacity tier 106.

As a more particular example of the latter type of arrangement, a given one of the replicated storage units in the first configuration is utilized to implement one or more metadata servers of the PFS of the software-defined storage pool 114 of the fast tier 104 and in the second configuration is utilized to implement one or more object storage servers for the object store 118 of the capacity tier 106.

In some embodiments, each of at least a subset of the replicated storage units of the reconfigurable multi-tier storage system comprises substantially the same arrangement of hardware resources, such as a particular number of network ports, a particular number of non-volatile memory cards, and a particular number of storage drives. The network ports may comprise network ports configurable to support one or more of Gigabit Ethernet, InfiniBand and Omni-Path Host Fabric Interface. The non-volatile memory cards illustratively comprise flash memory cards. The storage drives may comprise hard disk drives, solid state drives or other types of storage drives as well as combinations of such storage drives.

These particular types of hardware resources are examples only, and numerous other hardware resources can be implemented within replicated storage units as that term is broadly used herein.

In addition, a reconfigurable multi-tier storage system can include different sets of replicated storage units with the replicated storage units of each set including substantially the same arrangement of hardware resources but the replicated storage units of different sets including different arrangements of hardware resources.

Different configurations of the reconfigurable multi-tier storage system of FIG. 1 can repurpose particular hardware resources of the replicated storage units between the fast tier 104 and the capacity tier 106 as needed.

For example, one or more of the network ports of a given replicated storage unit in the first configuration are utilized for communication between nodes of the software-defined storage pool 114 of the fast tier 104 and in the second configuration are utilized for communication between nodes of the scale-out NAS cluster 116 of the capacity tier 106.

As another example, one or more of the network ports of the given replicated storage unit in the first configuration are utilized for communication between nodes of the software-defined storage pool 114 of the fast tier 104 and in the second configuration are utilized for communication with object storage servers for the object store 118 of the capacity tier 106.

Other hardware resources of the replicated storage units can be repurposed between the fast tier 104 and the capacity tier 106.

For example, one or more of the non-volatile memory cards of the given replicated storage unit in the first configuration are utilized to implement a portion of the burst buffer appliances 112 of the fast tier 104 and in the second configuration are utilized to implement metadata acceleration storage for one or more nodes of the scale-out NAS cluster 116 of the capacity tier 106.

As another example, one or more of the non-volatile memory cards of the given replicated storage unit in the first configuration are utilized to implement a portion of the software-defined storage pool 114 of the fast tier 104 and in the second configuration are utilized to implement metadata acceleration storage for one or more nodes of the scale-out NAS cluster 116 of the capacity tier 106.

As a further example, one or more of the non-volatile memory cards of the given replicated storage unit in the first configuration are utilized to implement a portion of the burst buffer appliances 112 of the fast tier 104 and in the second configuration are utilized to implement one or more object storage servers for the object store of the back-end storage tier.

As yet another example, one or more of the non-volatile memory cards of the given replicated storage unit in the first configuration are utilized to implement a portion of the software-defined storage pool 114 of the fast tier 104 and in the second configuration are utilized to implement one or more object storage servers for the object store 118 of the capacity tier 106.

Again, these are only examples, and numerous other types of reconfigurations of the replicated storage units can be performed to support multiple distinct configurations of the reconfigurable multi-tier storage system of FIG. 1.

In such arrangements, one or more of the replicated storage units of the reconfigurable multi-tier storage system are repurposed for use in either the fast tier 104 or the capacity tier 106 in respective different configurations of the reconfigurable multi-tier storage system. The replicated storage units illustratively implement at least one of the burst buffer appliances 112 and the software-defined storage pool 114 of the fast tier 104 and implement at least one of the scale-out NAS cluster 116 and the object store 118 of the capacity tier 106.

The configuration of the replicated storage units is illustratively carried out at least in part under software control.

For example, portions of such storage control can be provided by the software-defined storage controller 110. Such a controller is illustratively configured to implement the software-defined storage pool 114 utilizing storage resources of a subset of the replicated storage units. The software-defined storage controller in some embodiments is implemented in a distributed manner over the replicated storage units, although other distributed arrangements utilizing storage nodes, compute nodes or combinations thereof are possible, as will be described in more detail elsewhere herein.

Again, the fast tier 104, capacity tier 106, data mover modules 108 and software-defined storage controller 110 are all assumed to be part of the reconfigurable multi-tier storage system of information processing system 100, although other arrangements are possible in other embodiments. For example, components such as data mover modules 108 and software-defined storage controller 110 in other embodiments can be implemented at least in part externally to the multi-tier storage system.

Also, it should be noted that components such as data mover modules 108 and software-defined storage controller 110 and that are shown as separate from the fast tier 104 and capacity tier 106 in the FIG. 1 embodiment can be implemented at least in part within at least one of the tiers. For example, as indicated previously, the software-defined storage controller 110 can be implemented in a distributed manner across multiple storage nodes of the system 100. The data mover modules 108 can similarly be implemented in a distributed manner using the same storage nodes that are used to implement respective portions of a distributed software-defined storage controller 110.

It is assumed that the fast tier 104 has a relatively high input-output processing speed and a relatively low capacity and the capacity tier 106 has a relatively low input-output processing speed and a relatively high capacity, although other types of multi-tier storage systems can be used in other embodiments.

The data mover modules 108 are illustratively coupled to the fast tier 104 and the capacity tier 106 and configured to control transfer of data between these storage tiers. The term "data movement" as used in this and other contexts herein is intended to be broadly construed, so as to encompass data migration as well as other types of movement of data between storage tiers of a multi-tier storage system. A given data mover module can be implemented at least in part on storage arrays or other storage platforms that implement at least portions of one or more of the storage tiers of the multi-tier storage system.

Each of at least a subset of the storage tiers of a multi-tier storage system comprises a plurality of storage drives with different types of storage drives being used in different ones of the storage tiers. For example, a fast tier may comprise flash drives while a capacity tier comprises hard disk drives or solid state drives. The particular storage drives used in a given storage tier may be varied in other embodiments, and multiple distinct storage drive types may be used within a single storage tier. The term "storage drive" as used herein is intended to be broadly construed, so as to encompass, for example, flash drives, hard disk drives, solid state drives, hybrid drives or other types of storage products and devices.

The storage drives utilized in the fast tier 104 are generally significantly faster in terms of read and write access times than the drives utilized in the capacity tier 106. Accordingly, the fast tier 104 in some embodiments is a relatively small storage tier optimized for TO processing speed, while the capacity tier 106 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Accordingly, numerous alternative storage tiering arrangements can be used in other embodiments. Such alternative arrangements can include, for example, one or more intermediate storage tiers arranged between the front-end and back-end storage tiers of a multi-tier storage system.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 104 and the capacity tier 106 of the multi-tier storage system are implemented in the form of a 2 TIERS™ storage system from Dell EMC. By way of example, a given 2 TIERS™ storage system may comprise fast tier 104 implemented using DSSD™ server-based flash storage devices, also from Dell EMC, and capacity tier 106 comprising scale-out NAS cluster 116 and object store 118. In such an arrangement, an IO dispatcher software layer of the 2 TIERS™ storage system may be configured, for example, to pre-fetch data from one or more of the scale-out NAS cluster 116 or the object store 118 of the capacity tier 106 into DSSD™ storage devices used to implement one or more of the burst buffer appliances 112 and the software-defined storage pool 114 of the fast tier 104, as well as to support other types of data movement.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 108 may be configured to control movement of data between the fast tier 104 and the capacity tier 106 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 108 can communicate with the compute nodes 102, fast tier 104, capacity tier 106 and software-defined storage controller 110 via one or more networks or other types of communication media. In distributed implementations, different modules or other portions of a given distributed system component such as data mover modules 108 or software-defined storage controller 110 or can be implemented in respective ones of a plurality of storage nodes.

Although shown as a separate component in this embodiment, the software-defined storage controller 110 in other embodiments can be implemented at least in part within the fast tier 104, the capacity tier 106 or within another system component.

As indicated previously, it is possible to implement the software-defined storage controller 110 in a distributed manner, with portions of the software-defined storage controller 110 possibly being implemented on respective storage nodes of the reconfigurable multi-tier storage system of the information processing system 100. Additionally or alternatively, distributed portions of the software-defined storage controller 110 can be implemented on respective ones of the compute nodes 102 or associated processing platforms. Other types of distributed implementations of the software-defined storage controller 110 are possible. The data mover modules 108 can similarly be implemented in a distributed manner.

It is to be appreciated that these and other features of illustrative embodiments are presented by way of example only, and should not be construed as limiting in any way.

Accordingly, different numbers, types and arrangements of system components such as compute nodes, storage tiers, data mover modules and software-defined storage controllers can be used in other embodiments.

The fast tier 104, capacity tier 106, data mover modules 108, software-defined storage controller 110, data mover modules 108, capacity tier 106 and possibly other elements of the system 100 can be implemented using one or more storage platforms. For example, a given storage platform can comprise any of a variety of different types of storage including storage area networks (SANs), direct-attached storage (DAS) and distributed DAS, as well as combinations of these and other storage types, including software-defined storage. A given storage platform may comprise storage arrays such as VNX® and Symmetrix VMAX® storage arrays or scale-out all-flash storage arrays such as XtremIO™, all commercially available from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The data mover modules 108 and software-defined storage controller 110, as well as other system components, may be implemented at least in part using processing devices of such processing platforms.

For example, in a distributed implementation of the software-defined storage controller 110, the software-defined storage modules of the distributed software-defined storage controller are implemented in respective LXCs running on respective ones of the storage nodes or compute nodes 102.

Communications between the various elements of system 100 may take place over one or more networks including network 105. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as Gigabit Ethernet, InfiniBand, Omni-Path Host Fabric Interface or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other types of systems comprising a reconfigurable multi-tier storage system implemented using replicated storage units.

Figure 4:
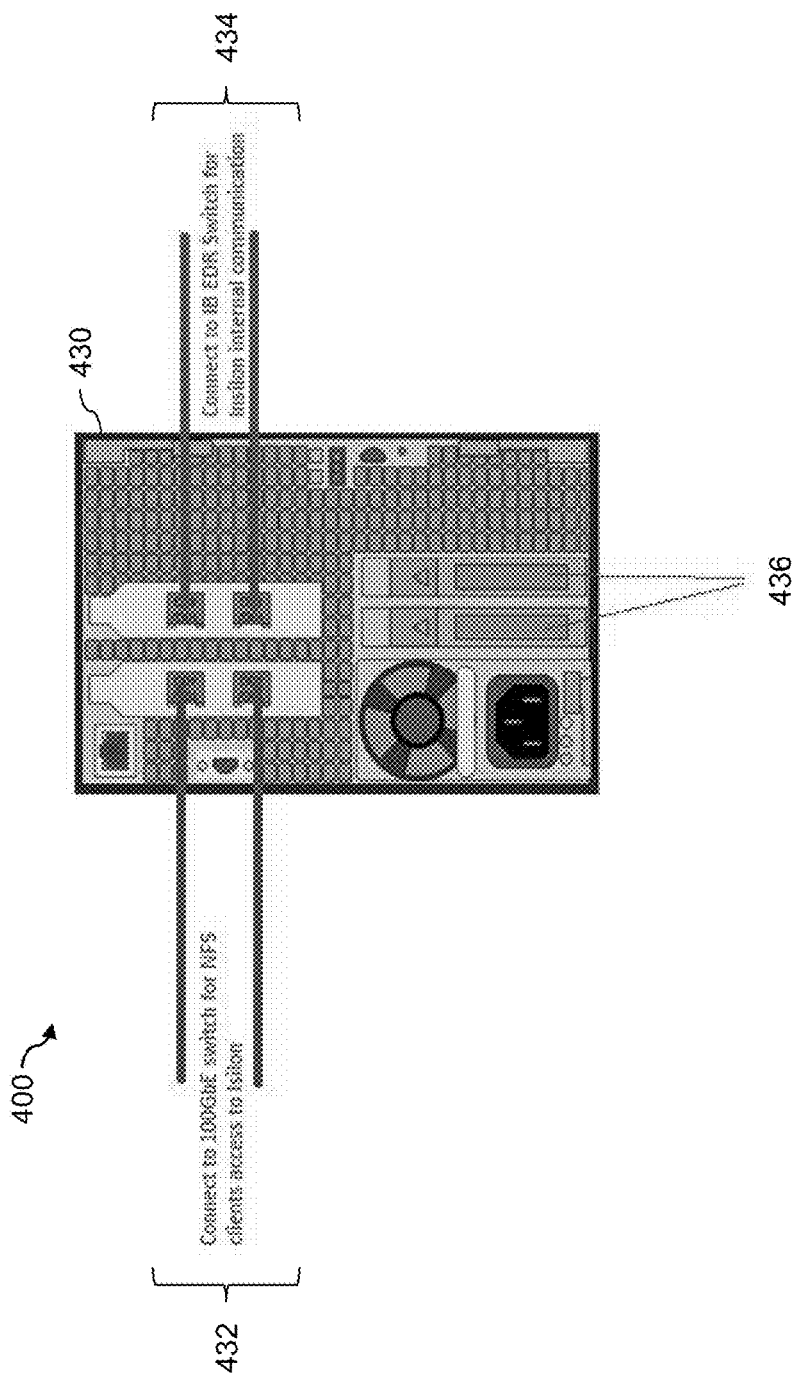
FIGS. 4 through 6 are diagrams illustrating different possible techniques for interconnecting a given one of a plurality of replicated storage units with other ones of the replicated storage units or other storage system components in respective distinct implementations of a reconfigurable multi-tier storage system of the type shown in FIG. 3.
Figure 5:
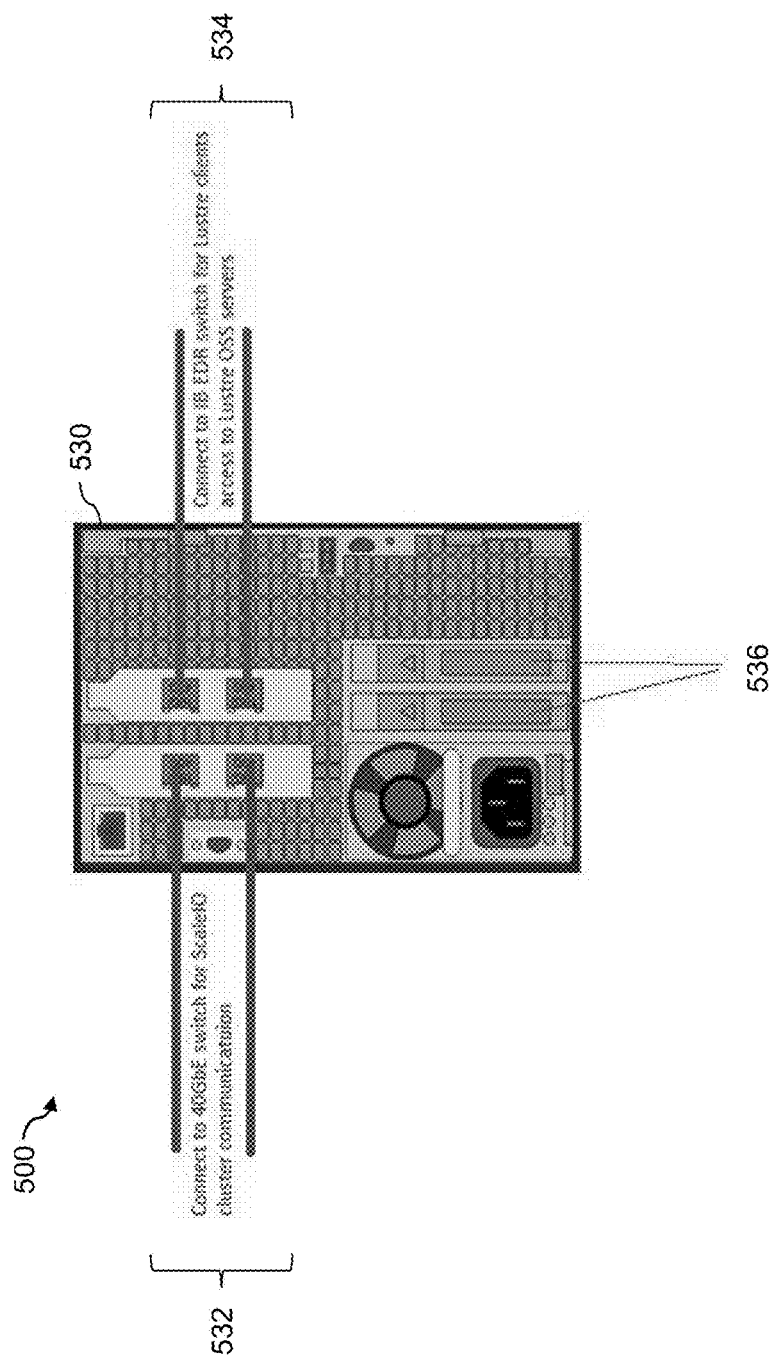
Figure 6:
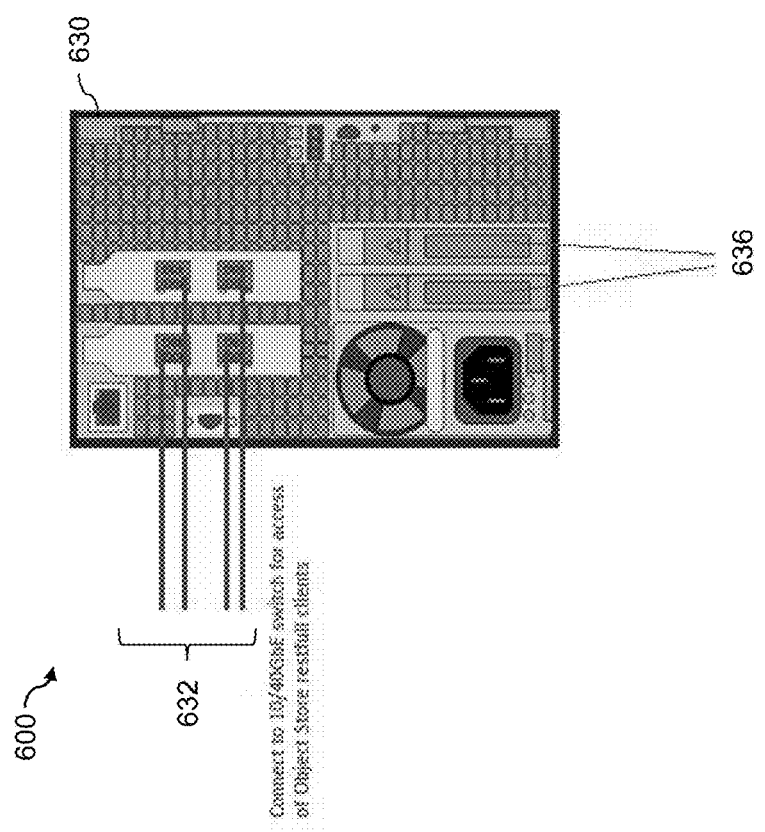
Figure 7:
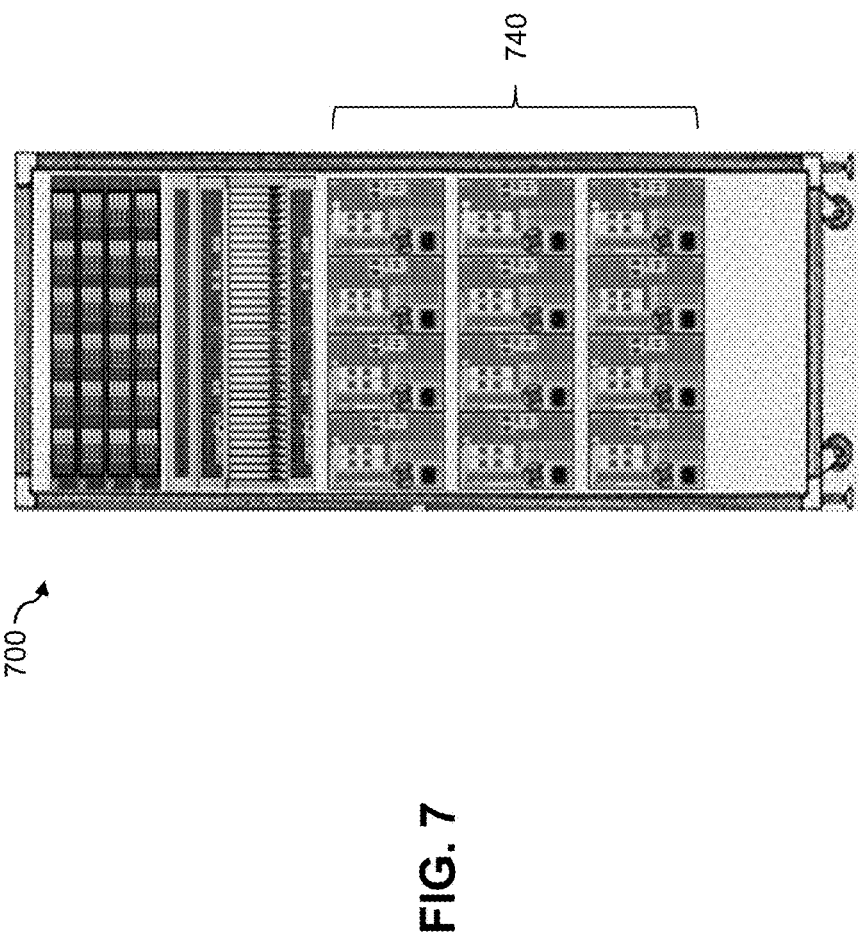
FIG. 7 illustrates the manner in which multiple replicated storage units of the type described in conjunction with FIGS. 4 through 6 can be arranged in an equipment rack.

In step 200, multiple rack-mountable replicated storage units of substantially the same design are installed in at least one equipment rack. Examples of such replicated storage units are shown in FIGS. 4, 5 and 6. An equipment rack containing multiple such installed replicated storage units is illustrated in FIG. 7.

In step 202, a particular arrangement of multiple ones of the storage units is interconnected to implement at least portions of a multi-tier storage system having a fast tier comprising at least one of a burst buffer appliance and a software-defined storage pool and a capacity tier comprising at least one of a scale-out NAS cluster and an object store.

With reference to the FIG. 1 embodiment, certain ones of the replicated storage units are utilized to implement at least a portion of one or both of the burst buffer appliances 112 and the software-defined storage pool 114 in a first configuration and are repurposed under software control for utilization in implementing at least a portion of one or both of the scale-out NAS cluster 116 and the object store 118 in a second configuration. Numerous other reconfigurations can be supported.

In step 204, software of the interconnected arrangement of replicated storage units is executed to complete an overall desired multi-tier storage system configuration. For example, this illustratively involves configuring a given one of the one or more replicated storage units for utilization in a first configuration by booting the given replicated storage unit utilizing one or more designated software modules. Such software modules illustratively comprise device drivers or other types of software modules that in conjunction with the booting of the replicated storage unit configure the particular protocols or other related functionality provided by particular hardware resources of the given replicated storage unit.

In step 206, the multi-tier storage system is reconfigured by repurposing one or more of the replicated storage units to a different storage tier of the multi-tier storage system. For example, this illustratively involves reconfiguring the given replicated storage unit from utilization in the first configuration to utilization in the second configuration by rebooting the given replicated storage unit utilizing one or more different software modules than those with which it was booted for utilization in the first configuration.

Figure 2:
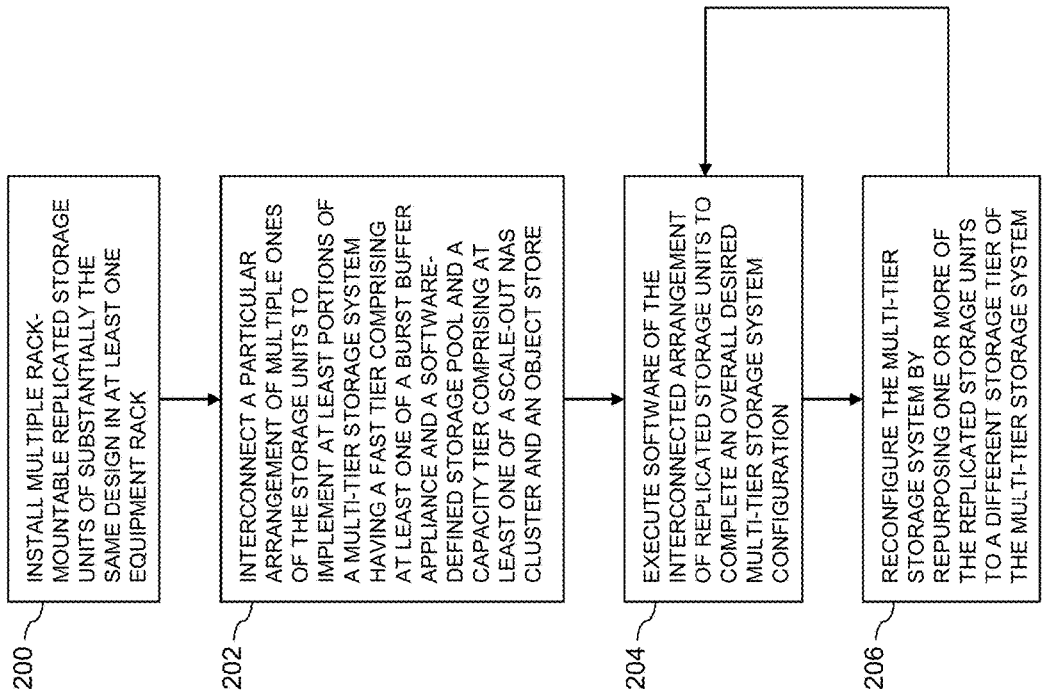
FIG. 2 is a flow diagram of a process for implementing a reconfigurable multi-tier storage system using multiple replicated storage units in an illustrative embodiment.

Accordingly, in the FIG. 2 embodiment, one or more of the replicated storage units are each utilized in a first configuration of the reconfigurable multi-tier storage system to implement a portion of at least one of a burst buffer appliance and a software-defined storage pool of the fast tier, and at least one of the one or more replicated storage units is utilized in a second configuration of the reconfigurable multi-tier storage system to implement a portion of at least one of a scale-out network-attached storage cluster and an object store of the capacity tier.

Steps 204 and 206 can be repeatedly iterated as needed as indicated by the feedback arrow from step 206 to step 204 in the figure.

It is to be appreciated that the FIG. 2 process can be adapted for use with other types of reconfigurable multi-tier storage systems, including by way of example a multi-tier storage system in which the fast tier comprises only burst buffer appliances or a software-defined storage pool but not both, and a multi-tier storage system in which the capacity tier comprises only a scale-out NAS cluster or an object store but not both.

As mentioned above, the software-defined storage controller in some embodiments comprises a ScaleIO™ software-defined storage controller or a ViPR® software-defined storage controller. The software-defined storage controller is illustratively implemented in a distributed manner over the respective ones of the replicated storage units. Other types of software-defined storage controllers can be used in other embodiments, and such software-defined storage controllers can be part of or otherwise associated with a given storage system comprising at least one storage platform.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a reconfigurable multi-tier storage system implemented using replicated storage units. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different storage system instances within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising compute nodes and a reconfigurable multi-tier storage system will now be described with reference to FIGS. 3 through 7. In each of these embodiments, the reconfigurable multi-tier storage system is implemented using replicated storage units.

Figure 3:
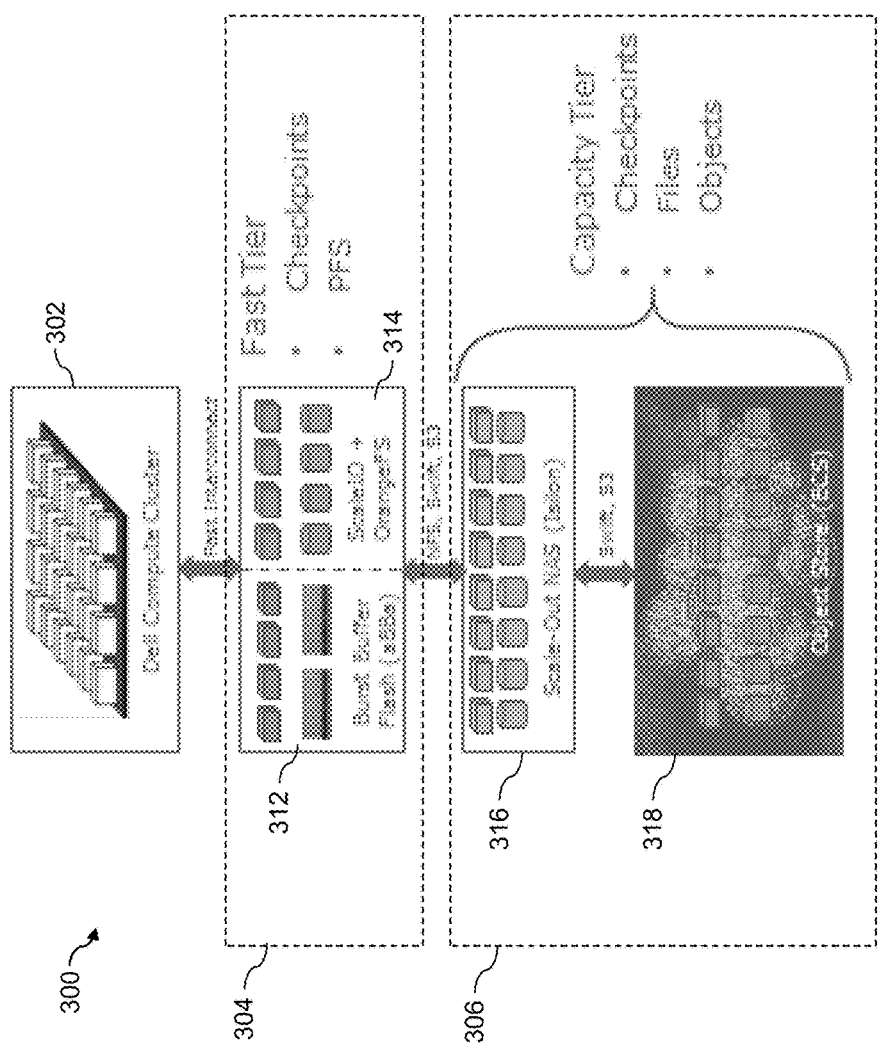
FIG. 3 is a block diagram of an information processing system comprising a reconfigurable multi-tier storage system implemented using multiple replicated storage units in another illustrative embodiment of the invention.

Referring now to FIG. 3, an information processing system 300 comprises a compute cluster 302 illustratively comprising a plurality of compute nodes implemented as respective Dell computers. The compute cluster 302 is assumed to comprise an HPC system. The compute cluster communicates via fast interconnects with a reconfigurable multi-tier storage system comprising a fast tier 304 and a capacity tier 306.

The fast tier 304 comprises a Lustre burst buffer flash appliance ("aBBa") 312 and a software-defined storage pool 314. The burst buffer flash appliance 312 in this embodiment implements a modified accelerated version of Lustre that utilizes flash devices as to support Lustre cache writeback. The software-defined storage pool 314 in this embodiment is implemented using ScaleIO™ software-defined storage and an OrangeFS file system. It is to be appreciated that other file systems, or combinations of multiple file systems of potentially different types, can be used in other embodiments.

The fast tier 304 provides additional storage functionality such as checkpointing of stored data. The resulting checkpoints are stored in the capacity tier 306.

The capacity tier 306 in this embodiment further implements storage of files and objects. More particularly, the capacity tier 306 comprises a scale-out NAS cluster 316 implemented using Isilon® platform nodes and an object store 318 implemented using cloud storage such as ECS.

The fast tier 304 communicates with the capacity tier 306 utilizing Network File System (NFS) protocols and additional protocols such as those associated with Swift and S3. The latter protocols are also utilized to support communication involving the scale-out NAS cluster 316 and the object store 318 in this embodiment. Swift is an object protocol from OpenStack that is supported by Isilon® nodes. Since the scale-out NAS cluster 316 of the capacity tier 306 in this embodiment utilizes Isilon® nodes, Swift is used as the object protocol to communicate with those nodes. S3 is another object protocol that is used to communicate with the object store 318 which is illustratively implemented using ECS. The data mover modules in this embodiment are therefore assumed to be configured to support both Swift and S3. Numerous alternative interconnections and associated protocols can be used in other embodiments. For example, other embodiments can utilize HDFS as a file protocol supported by Isilon® nodes within the capacity tier 306.

In the FIG. 3 embodiment, replicated storage units of the type illustrated in FIGS. 4 through 7 are utilized to implement at least portions of the fast tier 304 and the capacity tier 306. For example, certain ones of the replicated storage units that are utilized in a first configuration to implement portions of at least one of the burst buffer flash appliance 312 and the software-defined storage pool 314 are repurposed for utilization in a second configuration to implement portions of at least one of the scale-out NAS cluster 316 and the object store 318.

Referring now to FIG. 4, a replicated storage unit 400 comprises a rack-mountable chassis 430. The chassis 430 is viewed from the rear of the corresponding rack in this embodiment and a power cord connector and a fan are visible from this view. The chassis 430 is assumed to comply with established standards of height, width and depth to facilitate mounting of the chassis 430 in an equipment cabinet or other type of equipment rack. For example, standard chassis heights such as 1U, 2U, 3U, 4U and so on are commonly used, where U denotes a unit height of 1.75 inches (1.75") in accordance with the well-known EIA-310-D industry standard. More particularly, the chassis 430 in the FIG. 4 embodiment and other similar arrangements in the embodiments of FIGS. 5 through 7 are assumed to be 4U configurations, although other chassis configurations can be used in other embodiments.

The chassis 430 comprises sets of network ports 432 and 434. Additional hardware resources of the corresponding replicated storage unit 400 include a set of non-volatile memory ("NVMe") cards 436.

The hardware resources in some implementations of the replicated storage unit 400 more particularly comprise one or more storage processor (SP) nodes each comprising two InfiniBand ports, two 40 GbE ports, a 5 terabyte (TB) NVMe flash device and 20 hard disk drive (HDD) or solid state drive (SSD) drives interconnected using 12Gb serial-attached SCSI (SAS). Numerous other arrangements of hardware resources can be used.

The FIG. 4 embodiment illustrates one possible utilization of the replicated storage unit 400 in the reconfigurable multi-tier storage system of FIG. 3. More particularly, in this embodiment, the replicated storage unit 400 is configured under software control to provide a block storage device server more particularly comprising a single node of the scale-out NAS cluster 316. The block storage device server is assumed to connect to a 100 GbE switch via network ports 432 so as to be accessible to NFS clients of the system 300. The block storage device server is further assumed to connect to an InfiniBand 100Gb ("EDR") switch via network ports 434 for internal communications with other nodes of the scale-out NAS cluster 316. The NVMe cards 436 in this configuration are utilized to provide metadata acceleration functionality for the scale-out NAS cluster 316. The replicated storage unit 400 is illustratively implemented in this embodiment by booting the storage unit using a configuration file that causes appropriate software modules such as device drivers to be activated in order to provide the desired network port and NVMe card functionality.

Other possible utilizations of the replicated storage unit of FIG. 4 in the reconfigurable multi-tier storage system are illustrated in respective FIGS. 5 and 6. In each of these utilization examples, the replicated storage unit is repurposed under software control to implement a different portion of the reconfigurable multi-tier storage system. Each of the different arrangements of FIGS. 4, 5 and 6 alters its interconnection interface and other functionality under software control so as to interconnect in a different way with other ones of the replicated storage units or other components of the reconfigurable multi-tier storage system.

In the FIG. 5 embodiment, replicated storage unit 500 having chassis 530 is configured under software control so as to be utilized to provide Lustre object storage servers for the object store 318 of the capacity tier 306. The replicated storage unit 500 is assumed to connect to a 40 GbE switch via network ports 532 for communication with other storage nodes of the fast tier 304. The replicated storage unit 500 is further assumed to connect to an InfiniBand EDR switch via network ports 534 for communication with Lustre clients accessing the Lustre object storage servers. NVMe cards 536 in this configuration are utilized to provide portions of the burst buffer flash appliance 312 and the software-defined storage pool 314 of the fast tier 304. As in the FIG. 4 embodiment, the replicated storage unit 500 is illustratively implemented in this embodiment by booting the storage unit using a configuration file that causes appropriate software modules such as device drivers to be activated in order to provide the desired network port and NVMe card functionality.

In the FIG. 6 embodiment, replicated storage unit 600 having chassis 630 is configured under software control so as to be utilized to provide Lustre ECS servers of the object store 318 of capacity tier 306. The replicated storage unit 600 is assumed to connect to a 10/40 GbE switch via network ports 632 for communication with Representational State Transfer ("RESTful") clients of the object store 318. NVMe cards 636 in this configuration are utilized to provide ECS metadata acceleration for the object store 318. Additional functionality provided by the NVMe cards 636 in this configuration includes acceleration of erasure code calculations for RAID portions of the object store 318, where RAID denotes "redundant array of independent disks." Again, as in the embodiments of FIGS. 4 and 5, the replicated storage unit 600 is illustratively implemented in this embodiment by booting the storage unit using a configuration file that causes appropriate software modules such as device drivers to be activated in order to provide the desired network port and NVMe card functionality.

The replicated storage units 400, 500 and 600 in FIGS. 4, 5 and 6 illustratively represent the same storage unit reconfigured for three different types of utilization in the reconfigurable multi-tier storage system of FIG. 3. However, a wide variety of additional or alternative configurations and reconfigurations can be implemented using replicated storage units of the type described herein.

FIG. 7 illustrates the manner in which multiple replicated storage units of the type shown FIGS. 4 through 6 can be arranged in an equipment rack. In this embodiment, an equipment rack 700 comprises a plurality of replicated storage units 740 that collectively implement the reconfigurable multi-tier storage system comprising fast tier 304 and capacity tier 306 in the FIG. 3 embodiment. Numerous other arrangements of multiple replicated storage units can be utilized in other embodiments. For example, multiple replicated storage units of a given reconfigurable multi-tier storage system can be interconnected across a plurality of racks rather than a single rack as illustrated in FIG. 7.

Illustrative embodiments disclosed herein support a large number of diverse use cases. For example, some enterprise users may be working with large numbers of relatively small files such as those generated by Internet of Things (IoT) analytics applications running on an HPC cluster. In such an arrangement, PFS performance can be improved for the small files generated by the IoT applications by repurposing one or more of the replicated storage units such that the NVMe devices and storage drives of the storage unit are utilized to provide additional metadata servers for the PFS.

As another example, the replicated storage units can be reconfigured to improve bandwidth performance for genomics applications running on an HPC cluster. For example, replicated storage units can be repurposed as necessary from utilization as scale-out NAS cluster nodes to utilization as ScaleIO™ software-defined storage pool nodes so as to provide improved bandwidth performance in the fast tier.

As yet another example, storage efficiency for large objects can be improved by repurposing some of the replicated storage units from utilization as scale-out NAS cluster nodes to utilization as part of the object store.

These reconfiguration use cases are only examples and illustrative embodiments can be implemented in many other use cases.

It should be understood that the particular storage system arrangements illustrated in FIGS. 3 through 7 are presented by way of illustrative example only, and should not be construed as limiting in any way. Numerous alternative configurations of compute nodes, storage tiers, storage nodes, software-defined storage pools and other system elements can be used in other embodiments.

In these and other embodiments, a reconfigurable multi-tier storage system can be offered to cloud infrastructure customers as a platform-as-a-service offering.

Illustrative embodiments disclosed herein can provide a number of significant advantages relative to conventional arrangements.

For example, a reconfigurable multi-tier storage system comprising replicated storage units in an illustrative embodiment with repurposing of such storage units between different storage tiers in different configurations under software control can provide a substantial reduction in the costs associated with storage deployment in a wide variety of different information processing system contexts.

In some embodiments, reconfiguration of a given replicated storage unit is achieved by rebooting the given replicated storage unit utilizing one or more different device drivers or other software modules than those with which it was previously booted for utilization in another configuration. Such arrangements generally do not require any alteration in the hardware resources of the replicated storage unit.

The replicated storage unit can be configured under software control as part of a burst buffer appliance or software-defined storage pool of a fast tier, and subsequently reconfigured asunder software control as part of a scale-out NAS cluster or an object store of a capacity tier.

Illustratively embodiments not only significantly reduce storage costs relative to conventional arrangements, but can also provide significant improvements in terms of data access performance and scalability relative to conventional arrangements. For example, reduced data access latency can be provided and larger numbers of compute nodes supported than in conventional multi-tier storage system arrangements. Also, these embodiments can facilitate recovery from failures and therefore improve storage system availability.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102, fast tier 104, software-defined storage controller 110 and data mover modules 108 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage systems, storage tiers and replicated storage units. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a reconfigurable multi-tier storage system comprising at least a front-end storage tier and a back-end storage tier;
   the reconfigurable multi-tier storage system being implemented at least in part utilizing a plurality of replicated storage units;
   the replicated storage units comprising respective physical storage units each having substantially the same physical structure but being reconfigurable under software control to provide different types of storage functionality within the reconfigurable multi-tier storage system based at least in part on a plurality of distinct configuration files provided to the replicated storage units;
   wherein one or more of the replicated storage units are each utilized in a first configuration of the reconfigurable multi-tier storage system to implement a portion of at least one of a burst buffer appliance and a software-defined storage pool of the front-end storage tier;
   wherein at least one of the one or more replicated storage units is utilized in a second configuration of the reconfigurable multi-tier storage system to implement a portion of at least one of a scale-out network-attached storage cluster and an object store of the back-end storage tier; and
   wherein a given one of the one or more replicated storage units is reconfigured from utilization in the first configuration to utilization in the second configuration by rebooting the given replicated storage unit utilizing one or more different software modules than those with which it was booted for utilization in the first configuration.

2. The apparatus of claim 1 wherein reconfiguration of the reconfigurable multi-tier storage system is controlled at least in part utilizing distinct first and second configuration files provided to the replicated storage units for configuring the replicated storage units to implement respective ones of the first and second configurations.

3. The apparatus of claim 2 wherein a particular one of the configuration files is selectable at a boot time of the replicated storage units.

4. The apparatus of claim 1 wherein a given one of the replicated storage units in the first configuration is utilized to implement a portion of a parallel file system of the front-end storage tier and in the second configuration is utilized to implement one or more nodes of the scale-out network-attached storage cluster of the back-end storage tier.

5. The apparatus of claim 1 wherein a given one of the replicated storage units in the first configuration is utilized to implement a portion of a parallel file system of the front-end storage tier and in the second configuration is utilized to implement one or more object storage servers for the object store of the back-end storage tier.

6. The apparatus of claim 1 wherein a given one of the replicated storage units in the first configuration is utilized to implement one or more metadata servers of a parallel file system of the front-end storage tier and in the second configuration is utilized to implement one or more object storage servers for the object store of the back-end storage tier.

7. The apparatus of claim 1 wherein a given one of the replicated storage units comprises:
   a plurality of network ports;
   a plurality of non-volatile memory cards; and
   a plurality of storage drives.

8. The apparatus of claim 7 wherein the plurality of network ports comprises at least one of a plurality of Gigabit Ethernet ports, a plurality of InfiniB and ports and a plurality of Omni-Path Host Fabric Interface ports.

9. The apparatus of claim 7 wherein the plurality of storage drives comprise at least one of a plurality of hard disk drives and a plurality of solid state drives.

10. The apparatus of claim 7 wherein one or more of the network ports of the given replicated storage unit in the first configuration are utilized for communication between nodes of the software-defined storage pool and in the second configuration are utilized for communication between nodes of the scale-out network-attached storage cluster of the back-end storage tier.

11. The apparatus of claim 7 wherein one or more of the network ports of the given replicated storage unit in the first configuration are utilized for communication between nodes of the software-defined storage pool and in the second configuration are utilized for communication with object storage servers for the object store of the back-end storage tier.

12. The apparatus of claim 7 wherein one or more of the non-volatile memory cards of the given replicated storage unit in the first configuration are utilized to implement a portion of the burst buffer appliance of the front-end storage tier and in the second configuration are utilized to implement metadata acceleration storage for one or more nodes of the scale-out network-attached storage cluster of the back-end storage tier.

13. The apparatus of claim 7 wherein one or more of the non-volatile memory cards of the given replicated storage unit in the first configuration are utilized to implement a portion of the software-defined storage pool of the front-end storage tier and in the second configuration are utilized to implement metadata acceleration storage for one or more nodes of the scale-out network-attached storage cluster of the back-end storage tier.

14. The apparatus of claim 7 wherein one or more of the non-volatile memory cards of the given replicated storage unit in the first configuration are utilized to implement a portion of the burst buffer appliance of the front-end storage tier and in the second configuration are utilized to implement one or more object storage servers for the object store of the back-end storage tier.

15. The apparatus of claim 7 wherein one or more of the non-volatile memory cards of the given replicated storage unit in the first configuration are utilized to implement a portion of the software-defined storage pool of the front-end storage tier and in the second configuration are utilized to implement one or more object storage servers for the object store of the back-end storage tier.

16. The apparatus of claim 1 further comprising a software-defined storage controller configured to implement the software-defined storage pool utilizing storage resources of a subset of the replicated storage units.

17. The apparatus of claim 16 wherein the software-defined storage controller is implemented in a distributed manner over the replicated storage units.

18. A method comprising:
providing a plurality of replicated storage units; and
utilizing the replicated storage units to implement a reconfigurable multi-tier storage system comprising at least a front-end storage tier and a back-end storage tier;
the replicated storage units comprising respective physical storage units each having substantially the same physical structure but being reconfigurable under software control to provide different types of storage functionality within the reconfigurable multi-tier storage system based at least in part on a plurality of distinct configuration files provided to the replicated storage units;
wherein one or more of the replicated storage units are each utilized in a first configuration of the reconfigurable multi-tier storage system to implement a portion of at least one of a burst buffer appliance and a software-defined storage pool of the front-end storage tier;
wherein at least one of the one or more replicated storage units is utilized in a second configuration of the reconfigurable multi-tier storage system to implement a portion of at least one of a scale-out network-attached storage cluster and an object store of the back-end storage tier; and
wherein a given one of the one or more replicated storage units is reconfigured from utilization in the first configuration to utilization in the second configuration by rebooting the given replicated storage unit utilizing one or more different software modules than those with which it was booted for utilization in the first configuration.

19. The method of claim 18 further comprising controlling reconfiguration of the reconfigurable multi-tier storage system at least in part utilizing distinct first and second configuration files provided to the replicated storage units for configuring the replicated storage units to implement respective ones of the first and second configurations.

20. A computer program product comprising a non-transitory processor-readable storage medium having stored therein program code of one or more software programs, wherein the program code when executed by a processing platform causes said processing platform:
to provide a plurality of replicated storage units; and
to utilize the replicated storage units to implement a reconfigurable multi-tier storage system comprising at least a front-end storage tier and a back-end storage tier;
the replicated storage units comprising respective physical storage units each having substantially the same physical structure but being reconfigurable under software control to provide different types of storage functionality within the reconfigurable multi-tier storage system based at least in part on a plurality of distinct configuration files provided to the replicated storage units;
wherein one or more of the replicated storage units are each utilized in a first configuration of the reconfigurable multi-tier storage system to implement a portion of at least one of a burst buffer appliance and a software-defined storage pool of the front-end storage tier;
wherein at least one of the one or more replicated storage units is utilized in a second configuration of the reconfigurable multi-tier storage system to implement a portion of at least one of a scale-out network-attached storage cluster and an object store of the back-end storage tier; and
wherein a given one of the one or more replicated storage units is reconfigured from utilization in the first configuration to utilization in the second configuration by rebooting the given replicated storage unit utilizing one or more different software modules than those with which it was booted for utilization in the first configuration.

* * * * *